United States Patent [19]

Walpita et al.

[11] Patent Number: 5,348,990
[45] Date of Patent: Sep. 20, 1994

[54] LOW DIELECTRIC MATERIALS

[75] Inventors: Lakshaman M. Walpita, Bedminister; James B. Stamatoff, Westfield; George Lundberg, Long Valley, all of N.J.

[73] Assignee: Hoechst Celanese Corp., Somerville, N.J.

[21] Appl. No.: 25,205

[22] Filed: Mar. 2, 1993

[51] Int. Cl.$^5$ ................................ C08J 9/32
[52] U.S. Cl. ........................ 523/219; 428/421; 524/494
[58] Field of Search .......... 428/421; 523/219; 524/494

[56] References Cited

U.S. PATENT DOCUMENTS

| | | | |
|---|---|---|---|
| 3,316,139 | 4/1967 | Alford et al. | 428/227 |
| 4,134,848 | 1/1979 | Adicoff et al. | 523/219 |
| 4,417,020 | 11/1983 | Bailey et al. | 524/514 |
| 4,429,078 | 1/1984 | Cogswell et al. | 525/165 |
| 4,556,603 | 12/1985 | Thorsrud | 428/283 |
| 4,692,480 | 9/1987 | Takahashi et al. | 523/218 |
| 4,837,251 | 6/1989 | Okey et al. | 523/218 |
| 5,124,397 | 6/1992 | Kanazawa et al. | 524/496 |
| 5,126,192 | 6/1992 | Chellis et al. | 428/323 |

OTHER PUBLICATIONS

Prepreg for Laminate Board With Low Dielectric Constant-Obtd. by Impregnating Sheet Like Base Material With . . . Japanese Patent No. 4055437, dated Feb. 24, 1992. (abstract).

*Primary Examiner*—John Kight, III
*Assistant Examiner*—Terressa Mosley
*Attorney, Agent, or Firm*—Joseph M. Mazzarese

[57] ABSTRACT

A low dielectric material made of a liquid crystal polymer, polytetrafluoroethylene, and hollow glass spheres. This material is a relatively low cost, low dielectric blend having good physical strength and chemical and temperature resistance.

20 Claims, No Drawings

LOW DIELECTRIC MATERIALS

BACKGROUND OF THE INVENTION

This invention relates to the field of materials having a low dielectric constant, especially to such materials in the form of films containing a liquid crystal polymer ("LCP") suitable for use in the electronics industry.

In applications requiring electrical insulation, the effectiveness of a material as insulation is related to the dielectric constant and the thickness of the material. The dielectric constant is particularly crucial where increasing thickness is not a viable option, e.g., in electronic applications requiring thin film insulation layers. However, a material having a low dielectric constant may lack other important properties, such as chemical and temperature resistance, mechanical strength, and reasonable cost. To achieve the desired combination of properties, a material comprising a mixture of two or more components may be needed, for example, a relatively inexpensive low dielectric component and a higher performance component having the desired physical and chemical properties.

When a homogeneous mixture of dielectric elements or components is present, the dielectric constant of the multi-component material may be determined by averaging the dielectric constants of the components in proportion to the amount of each component present in the material.

Liquid crystal polymers generally exhibit good chemical, moisture and temperature resistance, and good mechanical strength, and can be formed into thin films that have a high degree of structural integrity. However, the cost and/or the dielectric constant of a film made solely of LCP may be too high for certain electronic applications.

Polytetrafluoroethylene ("PTFE") lacks the physical strength of an LCP, but has a lower dielectric constant and a greater chemical resistance.

Hollow glass spheres are inexpensive and generally have a low dielectric constant, depending on the size of the sphere and the wall thickness. Of course, to form films something must hold them together. However, when used in film-forming polymers, hollow glass provides good mechanical reinforcement and lowers the dielectric constant, cost, and weight of the material.

SUMMARY OF THE INVENTION

The present invention is a low dielectric material comprising a liquid crystal polymer, polytetrafluoroethylene, and hollow glass spheres. Preferably, the material is a film.

It is an object of the present invention to provide a low dielectric material having good physical strength and chemical and temperature resistance.

It is another object of the present invention to provide a low dielectric film useful in electronic circuits or integrated circuits.

It is a further object of the present invention to provide a low cost, low dielectric LCP blend.

It is also an object of the present invention to provide a suitable method for making the blends of this invention.

Other objects and advantages of the present invention will be apparent to those skilled in the art from the following description and the appended claims.

DETAILED DESCRIPTION OF THE PREFERRED EMBODIMENTS

In a preferred embodiment of the present invention, a liquid crystal polyester comprising repeating units derived from 4-hydroxybenzoic acid and 6-hydroxy-2-naphthoic acid is blended with PTFE and hollow glass spheres (also referred to as glass bubbles, glass balloons or glass microspheres).

These three components are blended at a suitable temperature, i.e., a temperature at which the polymers are easily mixed by not significantly decomposed, typically about 280°–b 375° C., preferably about 280°–360° C. A commercial melt mixer may be used. Preferably, the blend is extruded through a film/sheet die to form a film/sheet approximately 2–200 mils thick, preferably about 2–100 mils thick. Films approximately 5–40 mils thick are suitable for many applications. However, non-film articles also may be formed from the blend, or other methods known in the art may be used to form a film, e.g., calendering.

The three components may be melt blended together in one step, or two components may be blended together first and then the third component may be added and blended into the mixture. It has been found that, by first blending these two components together and then blending in the polytetrafluoroethylene, the adhesion between the hollow glass bubbles and the LCP may be improved and the void volume may be minimized.

A particularly preferred LCP is VECTRA® E, a polyester made by Hoechst Celanese Corporation from monomers derived from terephthalic acid (about 18 mole %), biphenol (about 18 mole %), 4-hydroxybenzoic acid (about 60%), and 6- hydroxy-2-naphthoic acid (about 4%). Other preferred LCPs include VECTRA® A and VECTRA® C, which are both made from monomers derived from 4-hydroxybenzoic acid and 6-hydroxy-2-naphthoic acid.

Other LCPs known in the art may be used in the practice of the invention, as well; the properties of the composition may be expected to vary accordingly. Low dielectric materials having desired characteristics for special applications may be obtained by choosing a suitable LCP, or mixture of LCPs, and suitable weight percentages of the components of the composition. Minor amounts of additives or fillers may also be added to the mixture, if desired. As a result of the many possible variations within the scope of the present invention, low dielectric materials suited to a wide range of applications may be made.

The preferred hollow glass bubbles or spheres have a mean diameter in the range of approximately 4–60 microns, a density in the range of approximately 0.16–0.80 gm/cm$^3$, and a crush resistance of at least from about 500 to about 10,000 psi. The glass bubbles should have a dielectric constant no greater than about 2.0; typically, the dielectric constant is in the approximate range of 1.1–2.0. Glass spheres outside these preferred parameters may be used; however, the properties of the blend may be adversely affected.

For example, if the density or dielectric constant of the glass spheres is higher, the density or dielectric constant of the blend will, of course, be somewhat higher. A hollow glass sphere having a poor crush resistance may be particularly unsuitable, since the hollow spheres would break during processing, thereby compromising the advantages of hollow glass.

The size of the glass spheres (and the glass composition) may vary widely; the importance of size (and composition) is mainly in the relationship between size and the other variables: density, dielectric constant and crush resistance, which depend on the thickness and density of the glass sphere walls and the proportion of hollow interior volume to glass wall volume.

Hollow glass spheres having a density of about 0.6 g/cm$^3$ and a crush resistance of about 6,000 to 10,000 psi are sold commercially by 3M Corp., headquartered in Minnesota. Hollow glass spheres having a density of about 0.26 g/cm$^3$ and a crush resistance of about 500 to 2000 psi are sold commercially under the name ECOSPHERE ™ by W. R. Grace Corp., which has offices in New York, and also by 3M Corp. These products have been used successfully in the practice of this invention.

The existing variety of suitable hollow glass spheres is another variable that may be used to tailor the composition of this invention for a particular purpose.

The LCP component of the composition of this invention typically comprises about 30–60% by weight of the total weight of the composition, and may be about 40–55%. Hollow glass typically comprises about 5–40 weight %, and suitably about 10–30 weight %, of the composition. Polytetrafluoroethylene may comprise about 10–50 %, suitably 15–35 % by weight, of the total composition.

A composition according to the present invention typically has a significantly lower tendency to pick up moisture, and a significantly lower electric dissipation factor, than pure LCP. These advantages are important in many applications, e. g., electronic applications.

The following Examples are presented to illustrate the present invention, but should not be construed as limiting the scope of this invention.

EXAMPLE

Several blends according to the present invention were prepared according to the procedure described below from the following three components: hollow glass bubbles ("G"), either having a density of 0.6 g/cm$^3$ and a dielectric constant of 1.7 ("Gi"), or having a density of 0.26 g/cm$^3$ and a dielectric constant of 1.16 ("G2"); polytetrafluoroethylene ("PTFE") having a density of 1.78 g/cm$^3$ and a dielectric constant of 1.9; and, VECTRA ® E polyester ("VE") having a density of 1.4 g/cm$^3$ and a dielectric constant of about 3.4.

These ingredients were combined in the proportions shown in Table 1 and blended together using a HAAKE ™ melt mixer at about 362° C.; each blend was extruded as a film 10–70 mils thick, as shown in Table 1.

The dielectric ("D.C.") constant of each film was measured by two separate standard methods known in the art: an HP 85070A radiofrequency probe up to 20 GHz was used to measure dielectric constant directly using pilase modulation; and, an electric pulse was applied to a strip line on the film to measure the time it takes for the pulse to travel across the film, from which an average dielectric constant over a frequency range was calculated. The results of these measurements are presented in Table 1.

Table 2 shows the estimated volume percentage for the components of these films, including void volume and solid (broken) glass ("SG") volume.

TABLE 1

| Composition (Wt %) | | | | D.C. | | Film |
|---|---|---|---|---|---|---|
| VE | PTFE | G1 | G2 | Probe | Pulse | Mils |
| 64 | 30 | 6 | — | — | 2.95 | 70 |
| 62 | 30 | 8 | — | 2.40 | 2.60 | 20 |
| 62 | 30 | — | 8 | 2.75 | 2.60 | 10 |
| 60 | 30 | — | 10 | 2.60 | 2.77 | 10 |

TABLE 2

| Composition (Wt %) | | | | Volume % (estimated) | | | | |
|---|---|---|---|---|---|---|---|---|
| VE | PTFE | G1 | G2 | PTFE | VE | G1/G2 | Void | SG |
| 64 | 30 | 6 | — | 16.2 | 45.0 | 22.7 | 5.3 | 10.8 |
| 62 | 30 | 8 | — | 15.3 | 40.1 | 27.9 | 5.3 | 11.5 |
| 62 | 30 | — | 8 | 21.2 | 56.1 | 16.7 | 6.0 | 0 |
| 60 | 30 | — | 10 | 20.4 | 52.0 | 19.7 | 5.9 | 2.0 |

Many variations of the present invention not illustrated herein will occur to those skilled in the art. The present invention is not limited to the embodiments illustrated and described herein, but encompasses all the subject matter within the scope of the appended claims.

We claim:

1. A low dielectric material comprising at least about 30% by weight of a liquid crystal polymer, at least about 10% by weight polytetrafluoroethylene, and at least about 5% by weight hollow glass spheres, wherein said material has dielectric constant in the approximate range of from 1.1 to 3.4.

2. A low dielectric material according to claim 1 wherein said liquid crystal polymer comprises repeating units derived from 4-hydroxybenzoic acid and 6-hydroxy-2-naphthoic acid.

3. A low dielectric material according to claim 1 wherein said liquid crystal polymer comprises from about 30 to about 60 percent by weight.

4. A low dielectric material according to claim 1 wherein said hollow glass spheres comprise from about 5 to about 30 percent by weight.

5. A low dielectric material according to claim 1 wherein said polytetrafluoroethylene comprises from about 10 to about 50 percent by weight.

6. A low dielectric material comprising:
   from about 30 to about 60 percent by weight of a liquid crystal polymer which comprises repeating units derived from 4-hydroxybenzoic acid and 6-hydroxy-2-naphthoic acid;
   from about 10 to about 50 percent by weight of polytetrafluoroethylene; and,
   from about 5 to about 40 percent by weight of hollow glass spheres.

7. A low dielectric material according to claim 6 wherein said liquid crystal polymer comprises from about 40 to about 55 weight percent, said polytetrafluoroethylene comprises from about 15 to about 35 weight percent, and said hollow glass spheres comprise about 10 to about 30 weight percent of said material.

8. A low dielectric material consisting essentially of:
   from about 30 to about 60 percent by weight of a liquid crystal polymer which comprises repeating units derived from 4-hydroxybenzoic acid and 6-hydroxy-2-naphthoic acid;
   from about 10 to about 50 percent by weight of polytetrafluoroethylene; and,
   from about 5 to about 40 percent by weight of hollow glass spheres.

9. A low dielectric material according to claim 8 in the form of a film.

10. A film according to claim 9 having a thickness of from about 2 to about 200 mils.

11. A film according to claim 9 having a thickness of from about 2 to about 100 mils.

12. A film according to claim 9 having a thickness of from about 5 to about 40 mils.

13. A process for making a low dielectric material according to claim 1 comprising the steps of:
   blending together approximately 30-60 parts by weight of a liquid crystal polymer and about 5-40 parts by weight of hollow glass spheres at a temperature in the approximate range of 280°-375° C. to form a mixture; and,
   subsequently blending about 10-50 parts by weight of polytetrafluoroethylene into said mixture at a temperature of about 280°-375° C.

14. A process according to claim 13 wherein in each step said temperature is about 280°-360° C.

15. A process for making a low dielectric material according to claim 1 comprising:
   blending together approximately 30-60 parts by weight of a liquid crystal polymer, about 10-50 parts by weight of polytetrafluoroethylene, and about 5-40 parts by weight of hollow glass spheres at a temperature in the approximate range of 280°-375° C.

16. A process according to claim 15 wherein said temperature is about 280°-360° C.

17. A film comprising the composition of claim 1.

18. A film according to claim 17 having a thickness of from about 2 to about 200 mils.

19. A film according to claim 17 having a thickness of from about 2 to about 100 mils.

20. A film according to claim 17 having a thickness of from about 5 to about 40 mils.

* * * * *